United States Patent
Ito et al.

(10) Patent No.: US 8,477,477 B2
(45) Date of Patent: Jul. 2, 2013

(54) POWER STORAGE DEVICE

(75) Inventors: Kyosuke Ito, Kanagawa (JP); Kiyofumi Ogino, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 132 days.

(21) Appl. No.: 12/890,867

(22) Filed: Sep. 27, 2010

(65) Prior Publication Data

US 2011/0075325 A1    Mar. 31, 2011

(30) Foreign Application Priority Data

Sep. 30, 2009  (JP) ................................. 2009-228400

(51) Int. Cl.
*H01G 9/00*    (2006.01)

(52) U.S. Cl.
USPC ........... 361/502; 361/503; 361/504; 361/512; 361/519; 361/523

(58) Field of Classification Search
USPC ......... 361/502, 503–504, 509–512, 516–519, 361/523–529; 429/162, 302
See application file for complete search history.

(56) References Cited

U.S. PATENT DOCUMENTS

| | | | |
|---|---|---|---|
| 6,335,123 B1 | 1/2002 | Lascaud et al. | |
| 6,339,528 B1 | 1/2002 | Lee et al. | |
| 6,466,421 B1 * | 10/2002 | Monden et al. | 361/15 |
| 2004/0048157 A1 * | 3/2004 | Neudecker et al. | 429/231.2 |
| 2004/0188789 A1 | 9/2004 | Koyama et al. | |
| 2005/0153173 A1 | 7/2005 | Kumashiro et al. | |
| 2006/0154071 A1 | 7/2006 | Homma et al. | |
| 2007/0139862 A1 | 6/2007 | Tateishi et al. | |
| 2008/0193853 A1 | 8/2008 | Kim et al. | |
| 2009/0015987 A1 | 1/2009 | Miura et al. | |

FOREIGN PATENT DOCUMENTS

| | | |
|---|---|---|
| JP | 2000-036441 | 2/2000 |
| JP | 2002-158140 | 5/2002 |
| JP | 2003-142343 | 5/2003 |
| JP | 2004-055240 | 2/2004 |
| JP | 2004-247646 | 9/2004 |
| JP | 2004-303910 | 10/2004 |
| JP | 2005-252217 | 9/2005 |
| JP | 2008-251831 | 10/2008 |
| WO | WO 2005-036573 | 4/2005 |

* cited by examiner

*Primary Examiner* — Nguyen T Ha
(74) *Attorney, Agent, or Firm* — Nixon Peabody LLP; Jeffrey L. Costellia

(57) ABSTRACT

To provide an electrolyte easily manufactured at low cost, and a power storage device including such an electrolyte. The power storage device includes a positive electrode having a positive electrode current collector and a positive electrode active material, a negative electrode having a negative electrode current collector and a negative electrode active material, and an electrolyte having 1-piperidine-1-propanesulfonic acid or 1-piperidine-1-butanesulfonic acid, which is provided between the positive electrode and the negative electrode. The capacitance can be increased when water is added to the obtained electrolyte and the temperature of the power storage device rises.

20 Claims, 4 Drawing Sheets

101 103 105
102 104

104 103 102

104 105

101 102

105
104
103
102
101
107

POWER STORAGE DEVICE

BACKGROUND OF THE INVENTION

1. Field of the Invention

One embodiment of the disclosed invention relates to a power storage device.

2. Description of the Related Art

In recent years, environmental destruction is becoming serious around the world and a global-scale solution is required, which increases the importance of establishing and implementing the countermeasures. Consequently, effective use of energy, improvement in energy-saving technology, and development of new technology have been actively promoted at home and abroad by public and private sectors.

In terms of such effective use of energy, improvement in energy-saving technology, and development of new technology, secondary batteries (also referred to as batteries) and power storage devices such as electrochemical capacitors have attracted attention.

As the electrochemical capacitors, for example, an electric double-layer capacitor (EDLC) to which the principle of an electric double layer is applied is known. The electric double layer is a pair of charge layers having opposite polarities, which is formed at the interface between a conductor and an electrolyte solution when the conductor is immersed in the electrolyte solution. An element in which electric energy is physically stored in the electric double layer is an electric double-layer capacitor.

As compared to this electric double-layer capacitor, in a redox capacitor using oxidation and reduction of an electrode active material, oxidation and reduction reactions of an electrode active material can be utilized in addition to the power storage mechanism of the electric double-layer capacitor. Therefore, a redox capacitor has a larger storage capacitance than an electric double-layer capacitor. Another feature of a redox capacitor is to have a higher output than a secondary battery.

Further, an electrochemical capacitor using a solid electrolyte as an electrolyte has also been researched. It is known that, for example, a proton-conducting material (e.g., cesium hydrogen sulfate ($CsHSO_4$), see Patent Document 1), an ionic liquid (see Patent Document 2), or a conductive polymer (see Patent Document 3) is researched to be used as a solid electrolyte. Manufacturing process of such an electrolytic material is complicated, and might require high cost.

[Reference]

[Patent Documents]

[Patent Document 1] Japanese Published Patent Application No. 2004-247646

[Patent Document 2] PCT International Publication No. WO2005/036573

[Patent Document 3] Japanese Published Patent Application No. 2003-142343

SUMMARY OF THE INVENTION

An object of one embodiment of the disclosed invention is to provide an electrolyte which is easily manufactured at low cost, and a power storage device including such an electrolyte.

In view of the above problem, according to one embodiment of the disclosed invention, a novel material is easily manufactured at low cost for an electrolyte of a power storage device. According to another embodiment of the disclosed invention, a power storage device is manufactured using the obtained electrolyte.

One embodiment of the disclosed invention is a power storage device including a positive electrode having a positive electrode current collector and a positive electrode active material, a negative electrode having a negative electrode active material and a negative electrode current collector, and an electrolyte having 1-piperidine-1-propanesulfonic acid which is provided between the positive electrode and the negative electrode.

Another embodiment of the disclosed invention is a power storage device including a positive electrode having a positive electrode current collector and a positive electrode active material, a negative electrode having a negative electrode active material and a negative electrode current collector, and an electrolyte having 1-piperidine-1-butanesulfonic acid which is provided between the positive electrode and the negative electrode.

In any of the embodiments of the disclosed invention, the electrolyte includes water.

In any of the embodiments of the disclosed invention, the electrolyte is manufactured by ring-opening reaction of a molecular unit derived from a cyclic acid ester and adding it to a nitrogen atom of a secondary amine and six-membered cyclic amine molecular unit.

In any of the embodiments of the disclosed invention, the cyclic acid ester is 1,3-propanesultone, and the secondary amine and six-membered cyclic amine are piperidine.

In any of the embodiments of the disclosed invention, the cyclic acid ester is 1,4-butanesultone, and the secondary amine and six-membered cyclic amine are piperidine.

According to one embodiment of the disclosed invention, with use of piperidine which is a secondary amine and a six-membered cyclic amine and 1,3-propanesultone which is a cyclic acid ester, 1-piperidine-1-propanesulfonic acid (PPPS) which can be used for an electrolyte of a power storage device can be one-pot synthesized at high yield.

In addition, a power storage device using the PPPS for an electrolyte can be easily manufactured at low cost.

Furthermore, according to one embodiment of the disclosed invention, with use of piperidine which is a secondary amine and a six-membered cyclic amine and 1,4-butanesultone which is a cyclic acid ester, 1-piperidine-1-butanesulfonic acid which can be used for an electrolyte of a power storage device can be one-pot synthesized at high yield.

In addition, a power storage device using 1-piperidine-1-butanesulfonic acid for an electrolyte can be easily manufactured at low cost.

DETAILED DESCRIPTION OF THE INVENTION

Figure 1A:
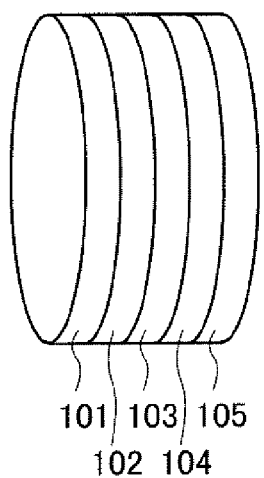
FIG. 1A is a perspective view of a power storage device.

Embodiments of the invention disclosed in this specification will be described below with reference to drawings. Note that the invention disclosed in this specification can be implemented in a variety of different modes, and it is apparent to those skilled in the art that modes and details can be modified in various ways without departing from the spirit and scope of the invention disclosed in this specification. Therefore, the invention is not construed as being limited to the description of the embodiments. Note that in the drawings shown below, like portions or portions having a similar function are denoted by like reference numerals, and the description thereof is omitted.

[Embodiment 1]

Embodiment 1 will be described with reference to FIGS. 1A to 1D and FIG. 2, FIG. 3, and FIG. 4.

In this embodiment, a redox capacitor is used as a power storage device.

FIG. 1A is a perspective view of a redox capacitor of this embodiment. The redox capacitor is a capacitor utilizing a reduction reaction (gain of electrons) and an oxidation reaction (loss of electrons).

The redox capacitor of this embodiment includes a first current collector 101, a first active material 102, a solid electrolyte 103, a second active material 104, and a second current collector 105. The first current collector 101 and the first active material 102 form a first electrode, and the second current collector 105 and the second active material 104 form a second electrode. One of the first electrode and the second electrode is a positive electrode and the other is a negative electrode.

As a material for the first current collector 101 and the second current collector 105, platinum, aluminum, copper, carbon, or the like can be used. In this embodiment, a carbon plate is used as the first current collector 101 and the second current collector 105.

As the first active material 102 and the second active material 104, it is possible to use, for example, ruthenium oxide (IV) ($RuO_2$), manganese oxide (IV) ($MnO_2$), poly(3,4-ethylenedioxythiophene) (abbreviation: PEDOT), $TiO_2$, $V_2O_2$, $CoO_x$, NiO, $Ru_{0.5}Zr_{0.5}O_2$, $SrRuO_3$, $La_{0.2}/Sr_{0.8}RuO_3$, $La_{0.2}Sr_{0.8}Mn_{0.2}Ru_{0.8}O_3$, $Pb_2Ru_2O_{6.5}$, or W—Ti—V—O. In this embodiment, ruthenium oxide ($RuO_2$) is used as the first active material 102 and the second active material 104.

As the solid electrolyte 103 in this embodiment, 1-piperidine-1-propanesulfonic acid (PPPS) (Chemical Formula 1) is used. A synthesis method of 1-piperidine-1-propanesulfonic acid (PPPS) (Chemical Formula 1) will be described below.

[Chemical Formula 1]

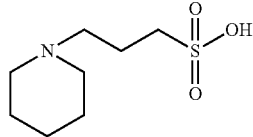

First, 4.25 g (50 mmol) of piperidine (Chemical Formula 2) which is a secondary amine is dissolved in 20 ml of ethyl acetate ($CH_3CO_2C_2H_5$), so that a liquid melt A is obtained.

[Chemical Formula 2]

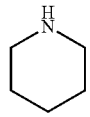

Further, 6.10 g (50 mmol) of 1,3-propanesultone (Chemical Formula 3) which is a cyclic acid ester is dissolved in 20 ml of ethyl acetate ($CH_3CO_2C_2H_5$), so that a liquid melt B is obtained. While stirred at room temperature, the liquid melt B is added to the liquid melt A gradually.

[Chemical Formula 3]

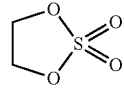

A solution in which the liquid melt B is added to the liquid melt A is stirred for about one hour. After the solution in which the liquid melt B is added to the liquid melt A is stirred for about one hour, a white precipitate is produced. The solution is stirred further for 12 hours so that the white precipitate is obtained; then, the solution in which the liquid melt B is added to the liquid melt A is filtered and the obtained white precipitate is washed with ethyl acetate plural times.

After the white precipitate is washed with ethyl acetate plural times, the white precipitate is dried under reduced pressure at 50° C. As the result of the drying under reduced pressure, 1-piperidine-1-propanesulfonic acid (PPPS) (Chemical Formula 1) which is a white powder can be obtained at a yield of 97%.

Pressure is added to the obtained white powdery PPPS in a pellet mill, whereby a pellet is formed. The obtained pellet is used as the solid electrolyte 103.

Alternatively, as the solid electrolyte 103 in this embodiment, 1-piperidine-1-butanesulfonic acid (Chemical Formula 4) may be used. A synthesis method of 1-piperidine-1-butanesulfonic acid (Chemical Formula 4) will be described below.

[Chemical Formula 4]

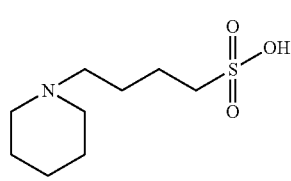

First, 6.80 g (50 mmol) of 1,4-butanesultone (Chemical Formula 5) which is a cyclic acid ester is dissolved in 20 ml of ethyl acetate ($CH_3CO_2C_2H_5$), so that a liquid melt C is obtained. While stirred at room temperature, the liquid melt C is added to the liquid melt A gradually.

[Chemical Formula 5]

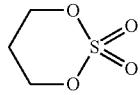

A solution in which the liquid melt C is added to the liquid melt A is heated and refluxed for two hours at 60° C. to 70° C. As the result of the heating and refluxing, a white precipitate is produced. After the heating and refluxing, the solution may be stirred for 12 hours at room temperature.

After the white precipitate is obtained, the solution in which the liquid melt C is added to the liquid melt A is filtered and the obtained white precipitate is washed with ethyl acetate plural times.

After the obtained white precipitate is washed with ethyl acetate plural times, the white precipitate is dried under reduced pressure at 50° C. As the result of the drying under reduced pressure, 1-piperidine-1-butanesulfonic acid (Chemical Formula 4) which is a white powder can be obtained at a yield of 72%.

Pressure is added to the obtained white powdery 1-piperidine-1-butanesulfonic acid in a pellet mill, whereby a pellet is formed. The obtained pellet is used as the solid electrolyte 103.

Figure 1B:
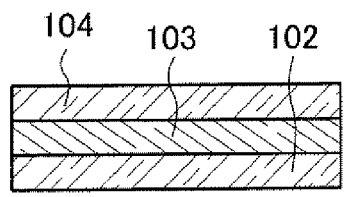
FIGS. 1B to 1D are cross-sectional views illustrating manufacturing steps of the power storage device.

The aforementioned material for the first active material 102 and the second active material 104 is applied on both ends of the pellet which is the solid electrolyte 103 obtained in the aforementioned manner (see FIG. 1B).

Figure 1C:
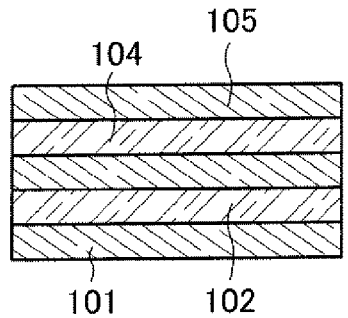

Then, the first current collector 101 and the second current collector 105 are provided in contact with the first active material 102 and the second active material 104, respectively (see FIG. 1C). Through the above steps, a redox capacitor which is a power storage device is manufactured.

Figure 1D:
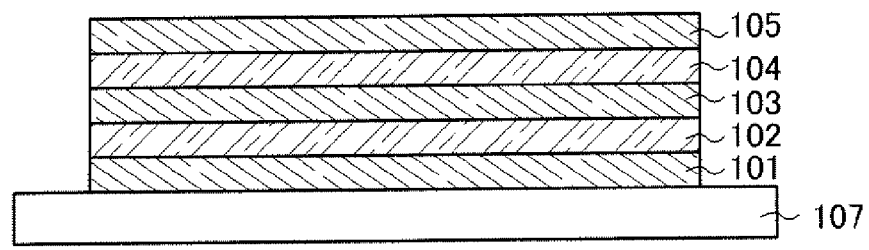

Alternatively, a redox capacitor may be manufactured in a manner illustrated in FIG. 1D: the first current collector 101, the first active material 102, the solid electrolyte 103, the second active material 104, and the second current collector 105 are stacked over a substrate 107.

As the substrate 107, it is possible to use not only a glass substrate, but also an insulating substrate such as a ceramic substrate, a quartz substrate, or a sapphire substrate, a semiconductor substrate made of a semiconductor such as silicon or gallium arsenide, or the like. In the case where a semiconductor substrate is used, an insulating layer may be formed between the substrate 107 and the first current collector 101.

Figure 2:
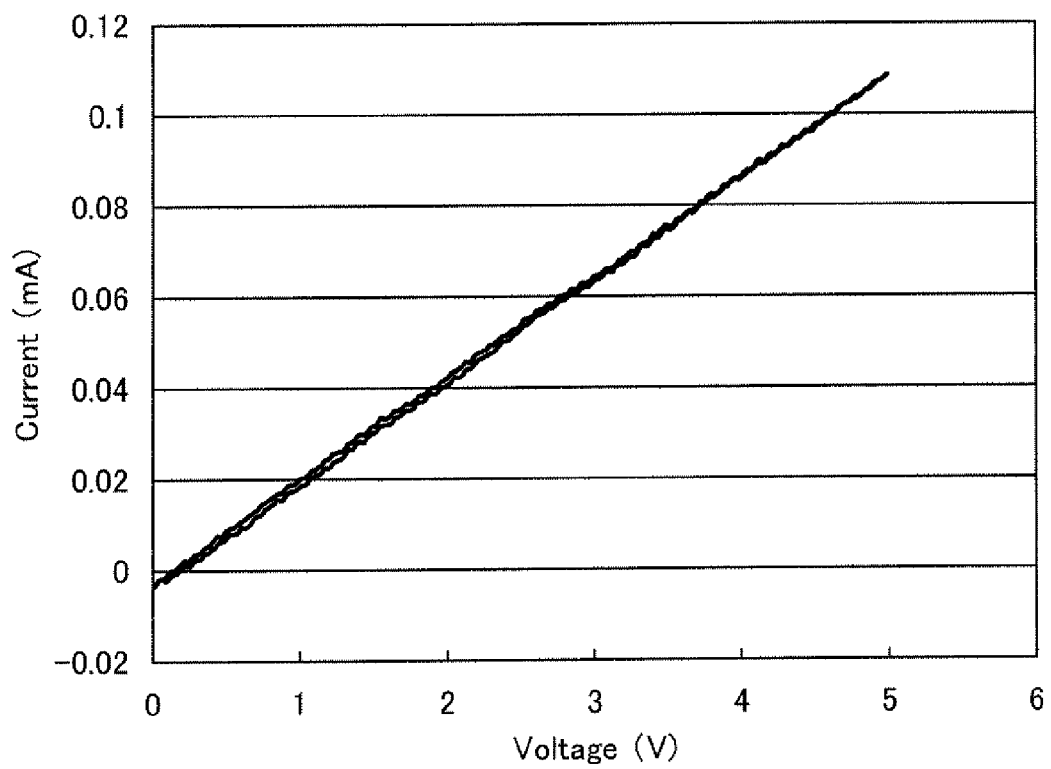
FIG. 2 is a graph showing a result of cyclic voltammetry measurement.
Figure 3:
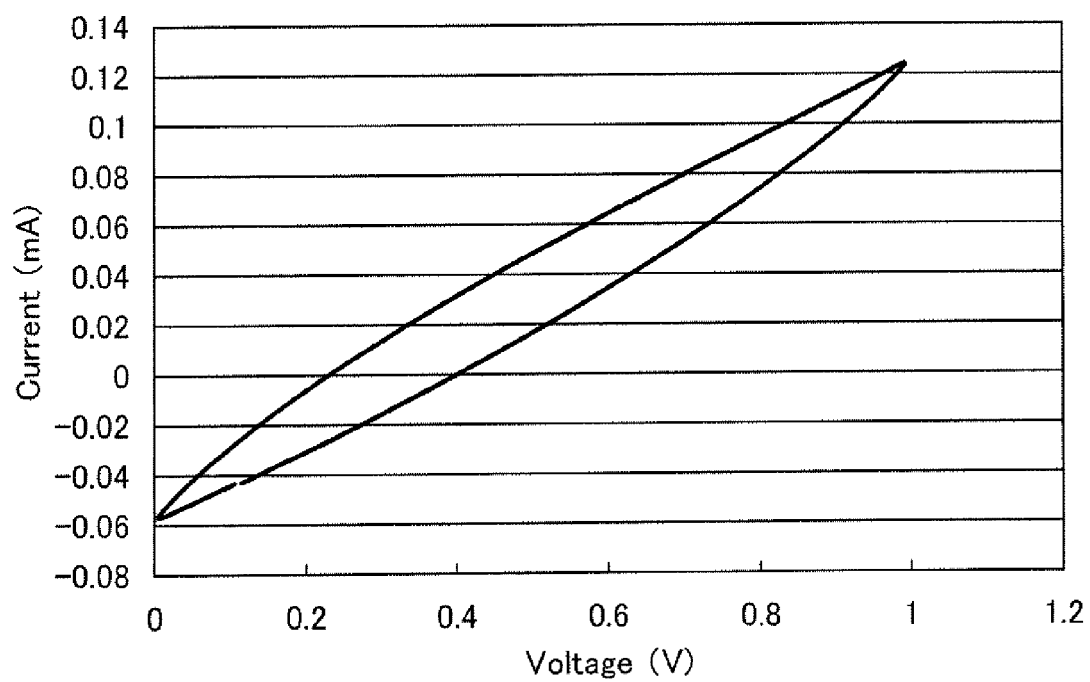
FIG. 3 is a graph showing a result of cyclic voltammetry measurement.
Figure 4:
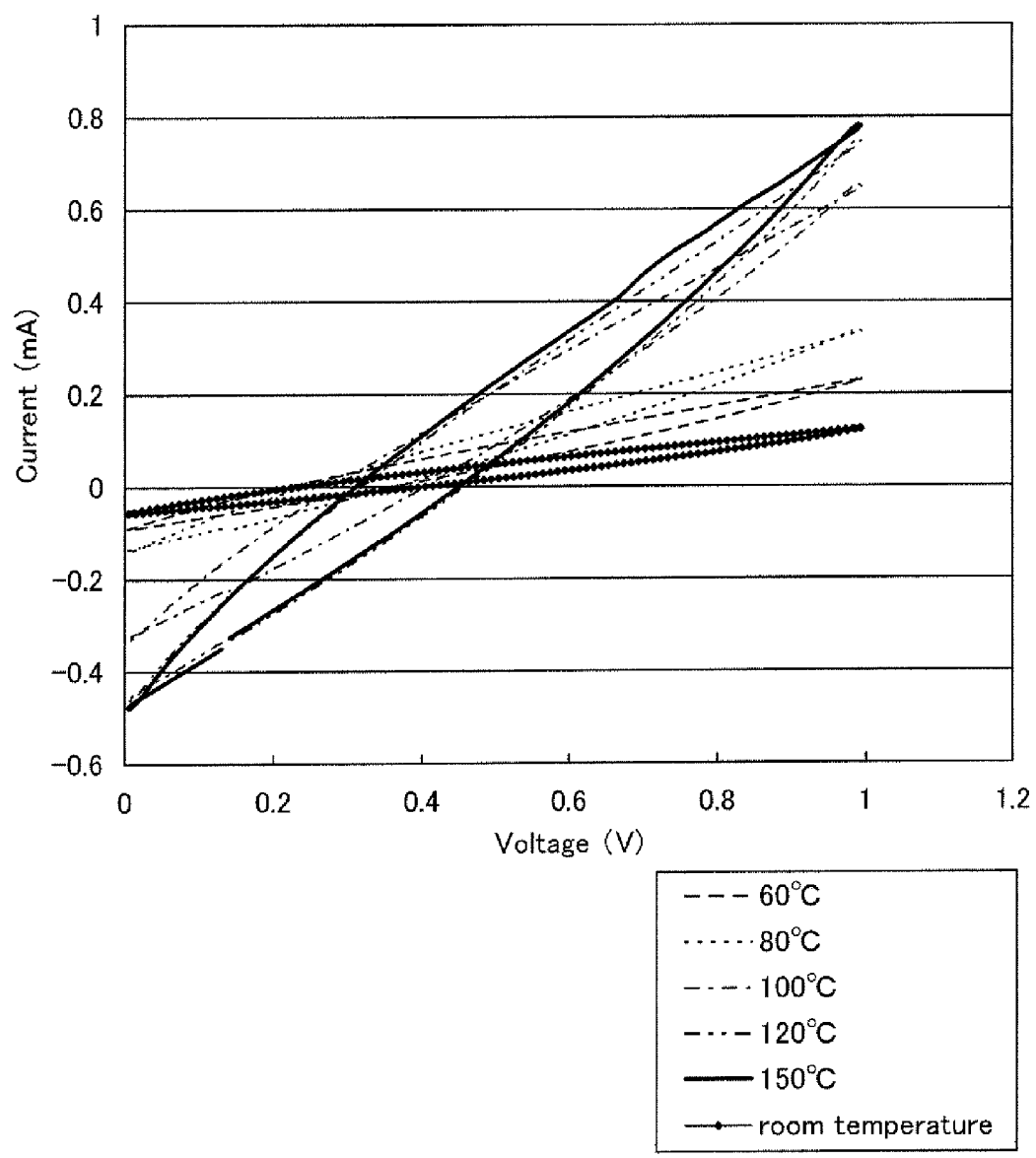
FIG. 4 is a graph showing a result of cyclic voltammetry measurement.

FIG. 2 to FIG. 4 show results of cyclic voltammetry (CV) measurement of the redox capacitor obtained in the aforementioned manner.

FIG. 2 shows a result of CV measurement at room temperature in the case where the solid electrolyte 103 of the obtained redox capacitor is not humidified, namely, in the case where water is not added to the solid electrolyte 103. In the case where the solid electrolyte 103 is not humidified, the redox capacitor has almost no capacitance. In other words, the redox capacitor hardly has proton-conducting properties.

FIG. 3 shows a result of CV measurement at room temperature in the case where the solid electrolyte 103 of the obtained redox capacitor is humidified, namely, in the case where water is added to the solid electrolyte 103. As shown in FIG. 3, the obtained redox capacitor has capacitance and functions as a redox capacitor. In other words, the redox capacitor has proton-conducting properties.

Furthermore, the obtained redox capacitor, which includes the solid electrolyte 103 humidified, is heated on a hot plate. As the temperature rises, the capacitance of the redox capacitor increases (see FIG. 4).

As described above, FIG. 2 to FIG. 4 show that the capacitance can be increased when water is added to the solid electrolyte 103 and the temperature of the redox capacitor rises.

As described in this embodiment, with use of piperidine which is a secondary amine and a six-membered cyclic amine and 1,3-propanesultone which is a cyclic acid ester, 1-piperidine-1-propanesulfonic acid (PPPS) which can be used for an electrolyte of a power storage device can be one-pot synthesized at high yield.

In addition, a power storage device using PPPS for an electrolyte can be easily manufactured at low cost.

Furthermore, as described in this embodiment, with use of piperidine which is a secondary amine and a six-membered cyclic amine and 1,4-butanesultone which is a cyclic acid ester, 1-piperidine-1-butanesulfonic acid which can be used for an electrolyte of a power storage device can be one-pot synthesized at high yield.

In addition, a power storage device using 1-piperidine-1-butanesulfonic acid for an electrolyte can be easily manufactured at low cost.

This application is based on Japanese Patent Application serial no. 2009-228400 filed with Japan Patent Office on Sep. 30, 2009, the entire contents of which are hereby incorporated by reference.

What is claimed is:

1. A power storage device comprising:
   a positive electrode including a positive electrode current collector and a positive electrode active material;
   a negative electrode including a negative electrode active material and a negative electrode current collector; and
   an electrolyte between the positive electrode and the negative electrode, the electrolyte including 1-piperidine-1-propanesulfonic acid,
   wherein the electrolyte includes water.

2. The power storage device according to claim 1, wherein the positive electrode, the negative electrode and the electrolyte are formed over an insulating substrate.

3. The power storage device according to claim 2, wherein the insulating substrate comprises glass, ceramic, quartz or sapphire.

4. The power storage device according to claim 1, wherein the positive electrode, the negative electrode and the electrolyte are formed over a semiconductor substrate.

5. The power storage device according to claim 4, wherein the semiconductor substrate comprises silicon or gallium arsenide.

6. The power storage device according to claim 1, wherein the positive electrode current collector comprises platinum, aluminum, copper or carbon.

7. The power storage device according to claim 1, wherein the negative electrode current collector comprises platinum, aluminum, copper or carbon.

8. The power storage device according to claim 1, wherein the positive electrode active material comprises ruthenium oxide (IV) ($RuO_2$), manganese oxide (IV) ($MnO_2$), poly(3,4-ethylenedioxithiophene), $TiO_2$, $V_2O_2$, $CoO_x$, NiO, $Ru_{0.5}Zr_{0.5}O_2$, $SrRuO_3$, $La_{0.2}Sr_{0.8}RuO_3$, $La_{0.2}Sr_{0.8}Mn_{0.2}Ru_{0.8}O_3$, $Pb_2Ru_2O_{6.5}$, or W—Ti—V—O.

9. The power storage device according to claim 1, wherein the negative electrode active material comprises ruthenium oxide (IV) ($RuO_2$), manganese oxide (IV) ($MnO_2$), poly(3,4-ethylenedioxithiophene), $TiO_2$, $V_2O_2$, $CoO_x$, NiO, $Ru_{0.5}Zr_{0.5}O_2$, $SrRuO_3$, $La_{0.2}Sr_{0.8}RuO_3$, $La_{0.2}Sr_{0.8}Mn_{0.2}Ru_{0.8}O_3$, $Pb_2Ru_2O_{6.5}$, or W—Ti—V—O.

10. The power storage device according to claim 1, wherein the electrolyte does not comprise lithium.

11. A power storage device comprising:
    a positive electrode including a positive electrode current collector and a positive electrode active material;
    a negative electrode including a negative electrode active material and a negative electrode current collector; and
    an electrolyte between the positive electrode and the negative electrode, the electrolyte including 1-piperidine-1-butanesulfonic acid,
    wherein the electrolyte includes water.

12. The power storage device according to claim 11, wherein the positive electrode, the negative electrode and the electrolyte are formed over an insulating substrate.

13. The power storage device according to claim 12, wherein the insulating substrate comprises glass, ceramic, quartz or sapphire.

14. The power storage device according to claim 11, wherein the positive electrode, the negative electrode and the electrolyte are formed over a semiconductor substrate.

15. The power storage device according to claim 14, wherein the semiconductor substrate comprises silicon or gallium arsenide.

16. The power storage device according to claim 11, wherein the positive electrode current collector comprises platinum, aluminum, copper or carbon.

17. The power storage device according to claim 11, wherein the negative electrode current collector comprises platinum, aluminum, copper or carbon.

18. The power storage device according to claim 11, wherein the positive electrode active material comprises ruthenium oxide (IV) ($RuO_2$), manganese oxide (IV) ($MnO_2$), poly(3,4-ethylenedioxithiophene), $TiO_2$, $V_2O_2$, $CoO_x$, NiO, $RuO_{0.5}Zr_{0.5}O_2$, $SrRuO_3$, $La_{0.2}Sr_{0.8}RuO_3$, $La_{0.2}Sr_{0.8}Mn_{0.2}Ru_{0.8}O_3$, $Pb_2Ru_2O_{6.5}$, or W—Ti—V—O.

19. The power storage device according to claim 11, wherein the negative electrode active material comprises ruthenium oxide (IV) ($RuO_2$), manganese oxide (IV) ($MnO_2$), poly(3,4-ethylenedioxithiophene), $TiO_2$, $V_2O_2$, $CoO_x$, NiO, $Ru_{0.5}Zr_{0.5}O_2$, $SrRuO_3$, $La_{0.2}Sr_{0.8}RuO_3$, $La_{0.2}Sr_{0.8}Mn_{0.2}Ru_{0.8}O_3$, $Pb_2Ru_2O_{6.5}$, or W—Ti—V—O.

20. The power storage device according to claim 11, wherein the electrolyte does not comprise lithium.

\* \* \* \* \*

UNITED STATES PATENT AND TRADEMARK OFFICE
CERTIFICATE OF CORRECTION

PATENT NO. : 8,477,477 B2  
APPLICATION NO. : 12/890867  
DATED : July 2, 2013  
INVENTOR(S) : Kyosuke Ito et al.

Page 1 of 1

It is certified that error appears in the above-identified patent and that said Letters Patent is hereby corrected as shown below:

In the Specification

Col. 3, line 35, "$La_{0.2}/Sr_{0.8}RuO_3$" should read --$La_{0.2}Sr_{0.8}RuO_3$--.

In the Claims

Col. 7, line 20, "$CoO_>$" should read --$CoO_x$--.

Signed and Sealed this  
Thirty-first Day of December, 2013

Margaret A. Focarino  
*Commissioner for Patents of the United States Patent and Trademark Office*